US010525915B2

United States Patent
Sturza et al.

(10) Patent No.: US 10,525,915 B2
(45) Date of Patent: Jan. 7, 2020

(54) REDUNDANT VEHICLE POWER SUPPLY CONTROL SYSTEMS AND METHODS

(71) Applicant: Ford Global Technologies, LLC, Dearborn, MI (US)

(72) Inventors: John Sturza, Royal Oak, MI (US); Masahiro Kimoto, Plymouth, MI (US); Tsung-Han Tsai, Pittsfield Township, MI (US); David Anthony Symanow, Plymouth, MI (US); Ray C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 15/804,727

(22) Filed: Nov. 6, 2017

(65) Prior Publication Data

US 2019/0135206 A1 May 9, 2019

(51) Int. Cl.
*B60R 16/033* (2006.01)
(52) U.S. Cl.
CPC .................... *B60R 16/033* (2013.01)
(58) Field of Classification Search
None
See application file for complete search history.

(56) References Cited

U.S. PATENT DOCUMENTS

| 8,994,208 B2 | 3/2015 | Huang | |
|---|---|---|---|
| 2015/0061378 A1* | 3/2015 | Nakagawa | H02J 1/08 307/9.1 |
| 2016/0082907 A1* | 3/2016 | Dong | B63J 3/00 307/9.1 |

FOREIGN PATENT DOCUMENTS

| CN | 205070594 U | 3/1916 |
|---|---|---|
| CN | 105857102 A | 8/1916 |
| CN | 106740582 A | 5/1917 |
| CN | 100397535 C | 6/2008 |
| CN | 102211553 B | 1/2014 |

OTHER PUBLICATIONS

Junk Yard Genius, *Dual Battery Diagrams & Ideas,* retrieved from http//www.junkyardgenius.com/charging/dual01.html on Aug. 11, 2017, 12 pages.

* cited by examiner

*Primary Examiner* — Jared Fureman
*Assistant Examiner* — Aqeel H Bukhari
(74) *Attorney, Agent, or Firm* — Frank Lollo; Eversheds Sutherland (US) LLP

(57) ABSTRACT

Method and apparatus are disclosed for controlling a high voltage power supply. An example vehicle includes first and second power supply buses, a high voltage power supply coupled to the first and second power supply buses, and a high voltage controller. The high voltage controller is configured to control the high voltage power supply, detect a short circuit on the first power supply bus, and responsively change a power source of the high voltage controller by activating an opto-isolator and one or more smart FETs.

18 Claims, 4 Drawing Sheets

REDUNDANT VEHICLE POWER SUPPLY CONTROL SYSTEMS AND METHODS

TECHNICAL FIELD

The present disclosure generally relates to vehicle electronics and, more specifically, systems and methods for redundant control of a vehicle power supply.

BACKGROUND

Modern hybrid and fully electric vehicles may include high voltage power supplies, configured to supply high voltage to one or more vehicle systems, such as steering, brakes, and drive control. The high voltage power supply may have a controller configured to connect and disconnect the high voltage power supply from the vehicle systems. The high voltage controller in turn may be powered by a low voltage battery, which may be a typical 12 volt vehicle battery.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for redundant control of a high voltage power supply in a vehicle. An example disclosed vehicle includes first and second power supply buses, a high voltage power supply coupled to the first and second power supply buses, and a high voltage controller. The high voltage controller is configured to control the high voltage power supply, detect a short circuit on the first power supply bus, and responsively change a power source of the high voltage controller by activating an opto-isolator and one or more smart FETs.

An example disclosed method includes controlling, by a high voltage controller, a high voltage power supply coupled to a first power supply bus and a second power supply bus of a vehicle. The method also includes detecting a short circuit on the first power supply bus. And the method further includes responsively changing a power source of the high voltage controller by activating an opto-isolator and one or more smart FETs.

A third example may include means for controlling, by a high voltage controller, a high voltage power supply coupled to a first power supply bus and a second power supply bus of a vehicle. The third example also includes means for detecting a short circuit on the first power supply bus. And the third example further includes means for responsively changing a power source of the high voltage controller by activating an opto-isolator and one or more smart FETs.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
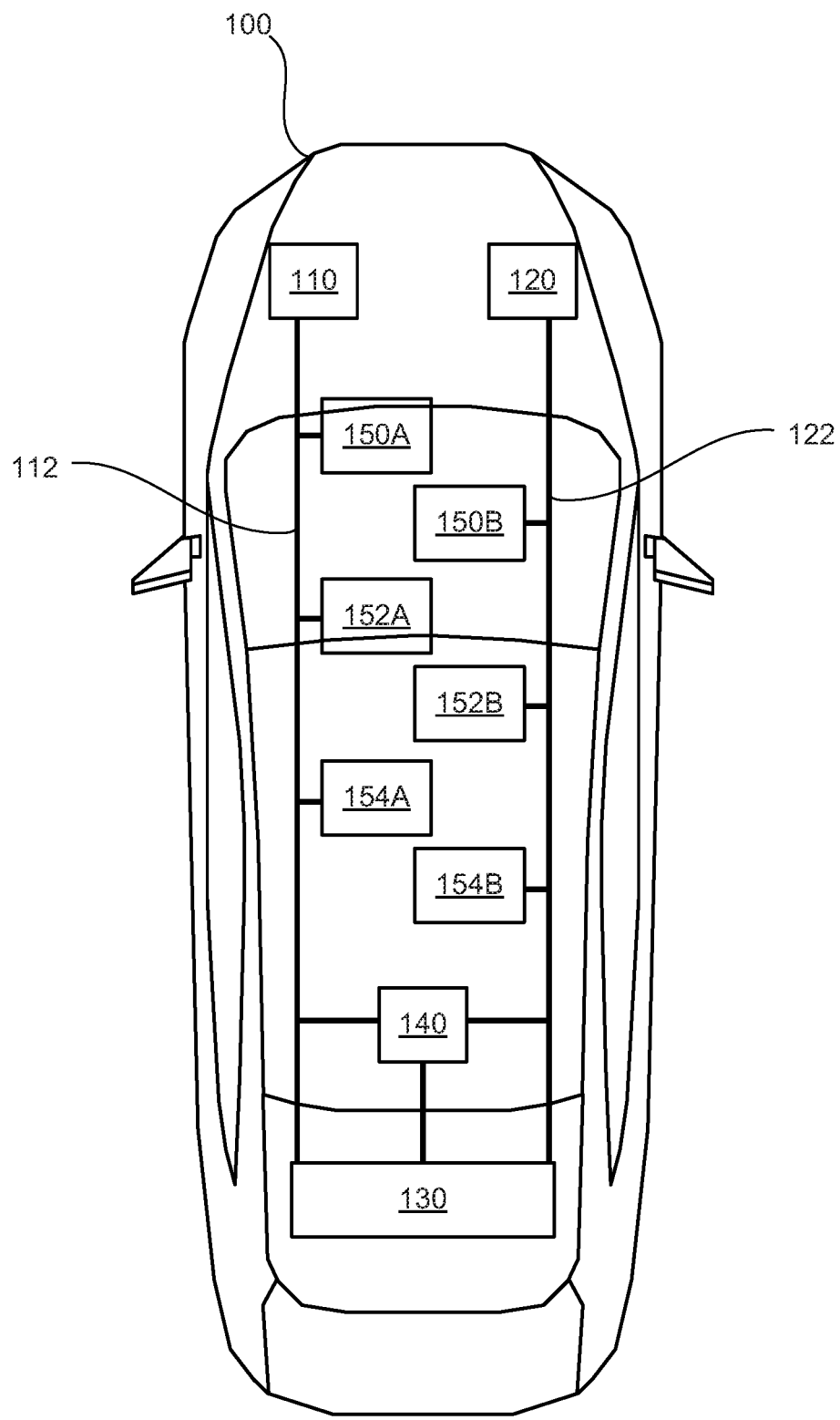
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, modern vehicles may include one or more high voltage power supplies configured to power one or more vehicle systems. Hybrid and all electric vehicles in particular may make use of high voltage power supplies to provide power to the drive train to move the vehicle. Other systems may also make use of the high voltage power, including steering systems, braking systems, and drive control systems.

Some vehicles may also include one or more low voltage power buses configured to control the same vehicle systems (e.g., the steering, brakes, and drive control). Each low voltage power supply bus may include a low voltage battery, which may be a 12 volt rechargeable battery. These batteries may be charged by the high voltage power supply during normal operation of the vehicle.

In some examples, the high voltage power supply may include one or more high voltage contactors, which when closed may enable the high voltage power supply to provide power to one or more vehicle systems. The high voltage contactors may be controlled by a high voltage controller, which in turn may be powered by one of the low voltage power supply buses (and by extension the low voltage battery. Vehicles may include two low voltage power supply buses that are independent, each configured to provide power to the vehicle systems. In the event that one power supply bus or corresponding battery fails, the other power supply bus and battery may be configured to provide power to the vehicle systems to allow the vehicle to come to a stop in a safe manner. If there were not two power supply buses present, a shorting of the lone power supply bus may cause a catastrophic failure by shorting out the steering, brakes, and other vehicle systems that may be necessary to safely stop the vehicle.

Further, the high voltage power supply is typically controlled by only one power supply bus. As such, if that power supply bus or battery fails, the high voltage power supply may be rendered inoperable, or at least unable to provide power to the vehicle systems. As such, the entire vehicle may be forced to run on a single low voltage power supply bus, which may not be able to provide sufficient power to run the necessary vehicle systems.

With these issues in mind, example embodiments of the present disclosure may provide a redundant power supply mechanism for controlling the high voltage power supply of a vehicle, such that if a first low voltage power supply bus is grounded, the vehicle can switch the power source of the high voltage controller from the first (now shorted) power supply bus to a second power supply bus. This may allow the high voltage power supply to provide power to the vehicle systems even where one of the low voltage power supply buses has failed.

In order to accomplish this, some examples may include providing a first high voltage controller powered by a first low voltage power supply bus, and a second high voltage controller powered by a second low voltage power supply bus. The first and second power supply buses may be independent from each other, such that a grounding or failure of one bus does not impact the other. The example may further include one or more opto-isolators, configured to control whether the first and/or second power supply bus is active or closed. And further, the example may include several smart field effect transistors (FETs) configured to detect when there is a short circuit on either low voltage power supply bus. Using these components, among others, examples disclosed herein may enable the high voltage controller to switch it's power source from a first bus to a second bus, thereby ensuring that if the first bus fails or is shorted, the high voltage controller can continue to operate.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a first power supply bus 112, a second power supply bus 122, and a high voltage power supply bus 130. Vehicle 100 may also include first and second batteries 110 and 120 and a high voltage controller 140. Further, vehicle 100 may include one or more vehicle systems, including steering systems 150A and 150B, brakes 152A and 152B, and vehicle drive control systems 154A and 154B. Each vehicle system may be powered by one or the first power supply bus 112 and the second power supply bus 122.

Power supply buses 112 and 122 may be coupled to respective batteries 110 and 120, which may be low voltage vehicle batteries. As such, batteries 110 and 120 may be 12 volt batteries. First power supply bus may 112 may be coupled to one or more vehicle systems, including steering system 150A, brake system 152A, and drive control system 154A. Second power supply bus 122 may be coupled to steering system 150B, brake system 152B, and drive control system 154B. Each set of systems may be redundant, such that either steering system 150A or 150B can provide the necessary control for vehicle 100.

In some examples, first power supply bus 112 and second power supply bus 122 may be independent. This may prevent a short on one power supply bus from shorting out the second power supply bus as well. As such, there may be one or more electrical components or systems not described herein that may be used for the purpose of maintaining the independence of the two power supply buses.

High voltage power supply 130 may be configured to provide a relatively high voltage, such as 48 volts or more, to one or more vehicle systems. High voltage power supply 130 may be coupled to the first and second power supply buses 112 and 122, so as to provide power to charge batteries 110 and 120, as well as to power on or more vehicle systems. In some examples, high voltage power supply 130 may be coupled to the first and second power supply buses through one or more DC/DC converters which may step down the high voltage from the high voltage power source 130 to a more appropriate lower voltage.

High voltage controller 140 may be configured to control the high voltage power source 130. As such, high voltage controller 140 may open or close one or more contactors of the high voltage power supply 130, so as to open or close a circuit and provide power from the high voltage power supply 130 to one or more vehicle systems.

In some examples, the high voltage controller 140 may be powered by either the first power supply bus 112 or the second power supply bus 122. Further, the high voltage controller 140 may include one or more components or systems configured to detect a short on one power supply bus, and responsively change the power source to the other power supply bus by activating an opto-isolator and one or more smart FETS. This is described in more detail below with respect to FIG. 3.

Figure 2:
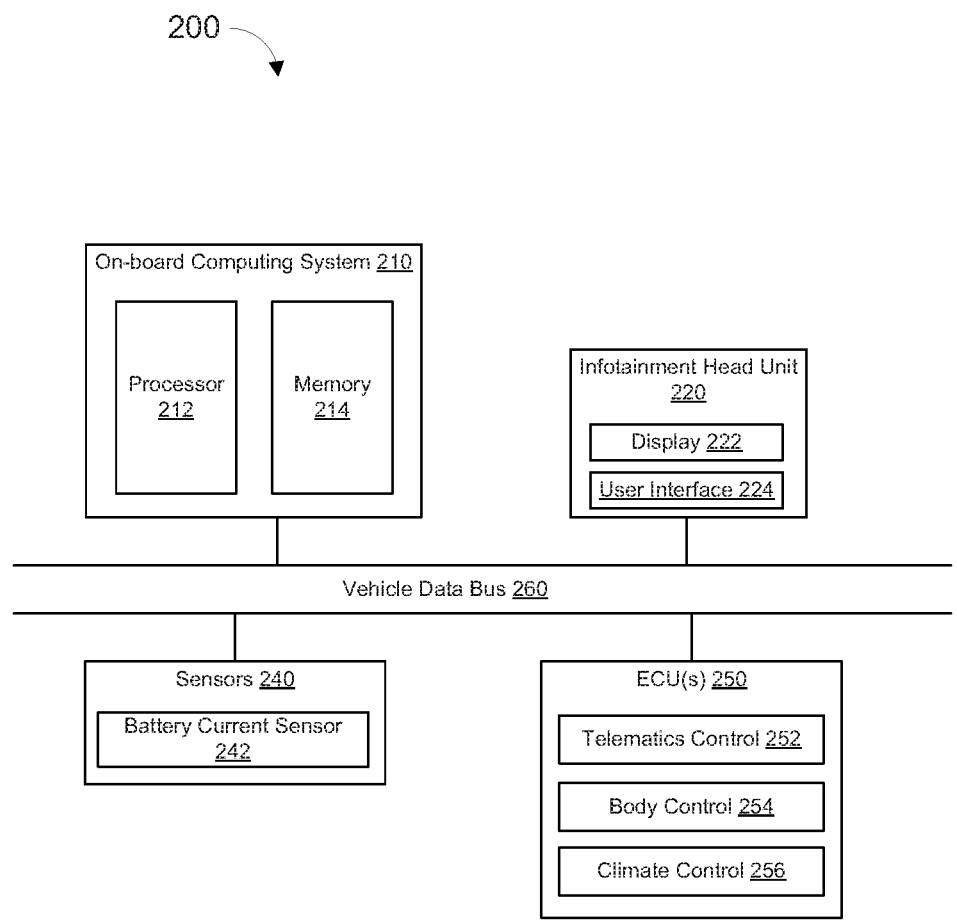
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the on-board computing system 210, infotainment head unit 220, sensors 240, electronic control unit(s) 250, and vehicle data bus 260.

The on-board computing system 210 may include a microcontroller unit, controller or processor 212 and memory 214. Further, high voltage controller 140 may be a part of the on-board computing system 210. Processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include a user interface 224 having one or more input and/or output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with on-board computing system 210. Additionally, the infotainment head unit 220 may display the infotainment system on, for example, a center console display 222 of vehicle 100. In some examples, an alert may be shown on display 222 indicating that the vehicle has switched the high voltage controller from a first power supply bus to a second power supply bus. This may provide a driver or passenger with information so as to safely stop the vehicle and/or take the vehicle to get maintenance or repairs completed.

Sensors 240 may be arranged in and around the vehicle 100 in any suitable fashion. In the illustrated example, sensors 240 include one or more battery current sensors 242. Other sensors may be included as well.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit (s) (such as integrated circuits, microprocessors, memory, storage, etc.) and firmware, sensors, actuators, and/or mounting hardware. In the illustrated example, ECUs 250 may include the telematics control unit 252, the body control unit 254, and the climate control unit 256.

The telematics control unit 252 may control tracking of the vehicle 100, for example, using data received by a GPS receiver and/or one or more sensors. The body control unit 254 may control various subsystems of the vehicle 100. For example, the body control unit 254 may control power a trunk latch, windows, power locks, power moon roof control, an immobilizer system, and/or power mirrors, etc. The climate control unit 256 may control the speed, temperature, and volume of air coming out of one or more vents. The climate control unit 256 may also detect the blower speed (and other signals) and transmit to the on-board computing system 210 via data bus 260. Other ECUs are possible as well.

Vehicle data bus 260 may include one or more data buses that communicatively couple the on-board computing system 210, infotainment head unit 220, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 260 may be a Media Oriented Systems Transport (MOST) bus, or a CAN flexible data (CAN-FD) bus (ISO 11898-7).

Figure 3:
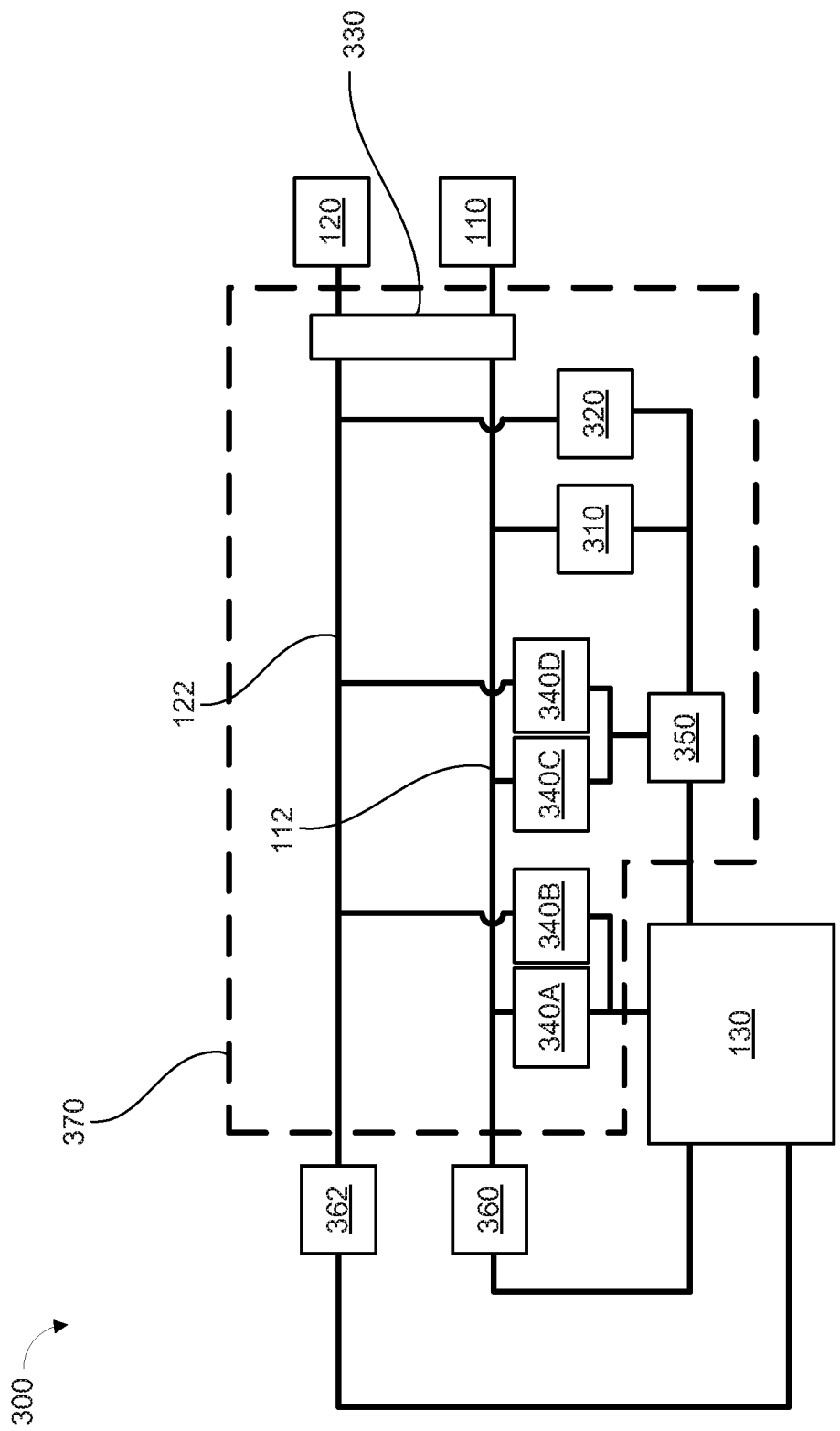
FIG. 3 illustrates a simplified block diagram of a vehicle power scheme according to embodiments of the present disclosure.

FIG. 3 illustrates a simplified block diagram of a vehicle power scheme 300 according to embodiments of the present disclosure. One or more features of FIG. 3 may be similar or identical to features shown in FIG. 1. For instance, FIG. 3 shows a first battery 110 coupled to a first power supply bus 112, and a second battery 120 coupled to a second power supply bus 122.

FIG. 3 also illustrates a high voltage power supply 130, which may be coupled to both the first power supply bus 110 and the second power supply bus 120 through DC/DC converters 360 and 362 respectively. This set up may allow the batteries 110 and 120 to be charged by high voltage power supply 130, and/or for one or more vehicle systems coupled to power supply buses 112 and 122 to be powered by the high voltage power supply bus via the DC/DC converters.

The high voltage controller 140 may include one or more components shown in FIG. 3, as well as one or more components that are not shown. High voltage controller 140 may include a first controller 310 and a second controller 320, as well as an opto-isolator 330, smart FETs 340A-D, and contactor power relay 350.

First and second controller may be configured to control the high voltage power supply. As such, first and second controllers 310 and 320 may include electronics configured to receive data, instructions, and/or commands from other vehicle systems or components, and responsively act to open or close the high voltage power supply. Other actions may be possible as well.

In some examples, either the first or second power supply bus 112 and 122 may be a closed circuit, meaning that only one of the first and second controller 310 and 320 is powered. As such, the high voltage power supply 130 may be controlled by one of the two controllers 310 or 320, and the high voltage controller 140 may be configured to switch from using the first power supply bus 112 and first controller 310 to using the second power supply bus 122 and second controller 320.

Control of the high voltage power supply by the first and/or second controllers 310 and 320 may include providing one or more signals to the contactor power relay 350. The contactor power relay 350 may include components configured to control the contactors of the high voltage power supply. This may allow the high voltage controller 140 to control whether the high voltage power supply 130 is open or closed so as to control whether the high voltage power supply 130 is either disconnected or connected to the first power supply bus 112 and the second power supply bus 122.

The high voltage controller 140 may include an opto-isolator 330, which may include one or more components configured to control whether power supply bus 110 and/or 120 are open or closed. The opto-isolator may comprise a light source on one end, and a photo resistive or other light affected electrical component on another end. The light source may act as a controller to send a signal to the light affected component, thereby controlling whether there is an open or closed circuit. The opto-isolator may thus control whether the second power supply bus 122 is on or off.

The high voltage controller 140 may also include a plurality of smart FETs 340A-D. Smart FETs 340A-D may act as switches that are configured to selectively power the contactor power relay 350, and high voltage power source 130. Smart FETs 340A-D may include processors and/or memory configured to detect a voltage level on the first power supply bus 112 and the second power supply bus 122 respectively. For example, smart FETs 340B and D may be configured to determine when there is a short (i.e., zero voltage) on the first power supply bus 112.

When a short is detected, the opto-isolator 330 of the high voltage controller 140 may cause the second power supply bus 122 to close, and/or the first power supply bus 110 to open. The first power supply bus 112 may be set as a default power supply bus for powering the first controller 310 of the high voltage controller 140. As such, when a short is detected on the first power supply bus 112, the opto-isolator 330 may close the second power supply bus 122 in order to power the second controller 320, and thus maintain control of the high voltage power source 130.

In order to maintain control of the high voltage power supply 130, when a short is detected by smart FETs 340B and 340D (such that the first controller 310 is no longer able to control the contactor power relay 350), the opto-isolator may close the second power supply bus 122. Smart FETs 340A and 340C may then determine that there is a voltage on the second power supply bus 122, and responsively close to allow the second power supply bus 122 and second controller 320 to power and control the contactor power relay 350 and the high voltage power supply 130.

Smart FETs 340A-D may allow the first power supply bus 112 and the second power supply bus 122 to both power the contactor power relay and the high voltage power supply bus, while maintaining the independence of the two power supply buses. In this manner, when one power supply bus experiences a failure or short, the other power supply bus is not affected by the short and can provide power to one or more of the vehicle systems.

In this disclosure, activating the opto-isolator 330 and/or smart FETs 340A-D may include opening or closing one or more connections, such that voltage and current are either passed through or not.

Figure 4:
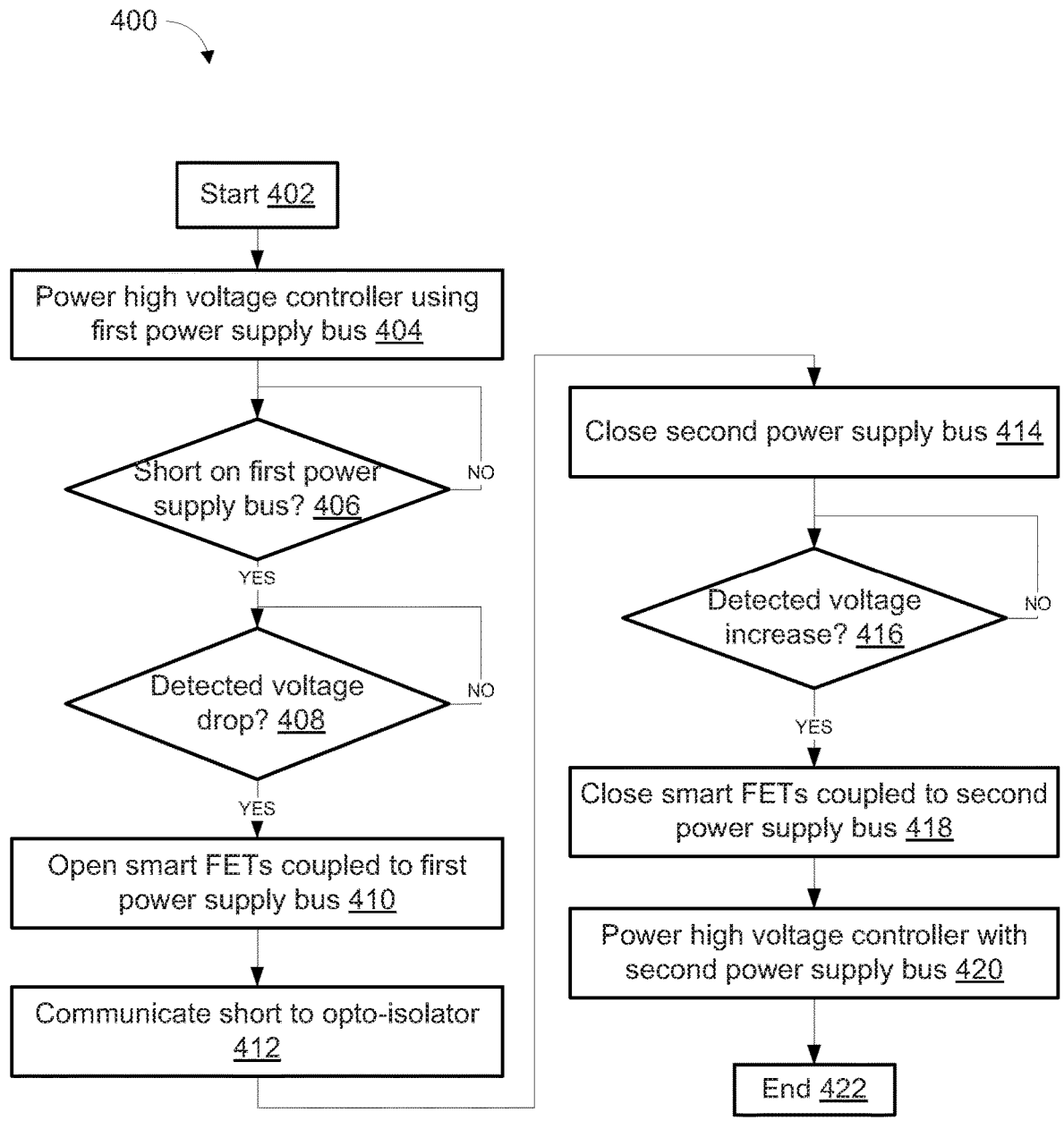
FIG. 4 illustrates a flowchart of an example method according to embodiments of the present disclosure.

FIG. 4 illustrates a flowchart of an example method 400 according to embodiments of the present disclosure. Method 400 may enable vehicle high voltage controller to maintain control over a high voltage power source by switching a source of power to the high voltage controller when a short is experienced. The flowchart of FIG. 4 is representative of machine readable instructions that are stored in memory (such as memory 214) and may include one or more programs which, when executed by a processor (such as processor 212) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include powering a high voltage controller using a first power supply bus. The high voltage controller may provide power and/or control signals to one or more vehicle components or systems in order to connect or disconnect a high voltage power source.

At block 406, method 400 may include determining whether the first power supply bus has experienced a short, or has other wised experienced a failure. The failure may be a failure of a battery powering the first power supply bus. If the first power supply bus has experienced a failure, block 408 may include determining whether one or more smart FETs (e.g., 340B and 340D) have detected a voltage drop based on the short.

If the one or more smart FETs have detected a voltage drop, block 410 may include opening of the smart FETs coupled to the first power supply bus. Block 412 may then include communicating that the first power supply bus has experienced a short to an opto-isolator. The opto-isolator may then be configured to close the second power supply bus at block 414.

At block 416, method 400 may include one or more smart FETs coupled to the second power supply bus detecting that there has been an increase in voltage (i.e., a non-zero or closed circuit.) If the smart FETs detect that there is a closed circuit, method 400 may include closing the smart FETs coupled to the second power supply bus in order to allow power from the second power supply bus to pass through the smart FETs.

Method 400 may then include powering the high voltage controller with the second power supply bus, rather than the shorted first power supply bus, at block 420. Method 400 may then end at block 422.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   first and second power supply buses;
   a high voltage power supply coupled to the first and second power supply buses; and
   a high voltage controller configured to:
   control the high voltage power supply;
   detect a short circuit on the first power supply bus; and
   responsively change a power source of the high voltage controller by activating an opto-isolator and one or more smart FETs.

2. The vehicle of claim 1, wherein the first and second power supply buses are coupled to respective first and second batteries.

3. The vehicle of claim 2, wherein the first and second batteries are configured to be charged by the high voltage power supply.

4. The vehicle of claim 1, wherein the first and second power supply buses are configured to control one or more vehicle systems comprising at least one of a steering system, brake system, and a vehicle drive control system.

5. The vehicle of claim 1, wherein the high voltage controller is further configured to be powered by one of the first or second power supply bus, wherein changing the power source comprises switching from the first power supply bus to the second power supply bus.

6. The vehicle of claim 1, wherein the high voltage controller comprises a first controller powered by the first power supply bus and a second controller powered by the second power supply bus, wherein only one of the first controller and the second controller is powered at a time.

7. The vehicle of claim 6, wherein both the first controller and the second controller are configured to control the high voltage power supply.

8. The vehicle of claim 1, further comprising a contactor power relay configured to control one or more contactors of the high voltage power supply, wherein the high voltage controller is further configured to control the contactor power relay.

9. The vehicle of claim 1, wherein the high voltage controller is further configured to detect the short circuit on the first power supply bus using the one or more smart FETs.

10. A method comprising:
controlling, by a high voltage controller, a high voltage power supply coupled to a first power supply bus and a second power supply bus of a vehicle;
detecting a short circuit on the first power supply bus; and
responsively changing a power source of the high voltage controller by activating an opto-isolator and one or more smart FETs.

11. The method of claim 10, wherein the first and second power supply buses are coupled to respective first and second batteries.

12. The method of claim 11, wherein the first and second batteries are configured to be charged by the high voltage power supply.

13. The method of claim 10, wherein the first and second power supply buses are configured to control one or more vehicle systems comprising at least one of a steering system, brake system, and a vehicle drive control system.

14. The method of claim 10, wherein the high voltage controller is further configured to be powered by one of the first or second power supply bus, wherein changing the power source comprises switching from the first power supply bus to the second power supply bus.

15. The method of claim 10, wherein the high voltage controller comprises a first controller powered by the first power supply bus and a second controller powered by the second power supply bus, wherein only one of the first controller and the second controller is powered at a time.

16. The method of claim 15, wherein both the first controller and the second controller are configured to control the high voltage power supply.

17. The method of claim 10, further comprising:
controlling, by the high voltage controller, a contactor power relay configured to control one or more contactors of the high voltage power supply.

18. The method of claim 10, wherein detecting the short circuit on the first power supply bus comprises using the one or more smart FETs to detect the short circuit.

* * * * *